United States Patent
McGrath et al.

(10) Patent No.: US 9,809,122 B2
(45) Date of Patent: Nov. 7, 2017

(54) CHARGE HEAD LANDING SWITCH

(71) Applicant: Proterra Inc., Greenville, SC (US)

(72) Inventors: Seamus T. McGrath, Simpsonville, SC (US); Ryan P. Watts, Simpsonville, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/980,697

(22) Filed: Dec. 28, 2015

(65) Prior Publication Data

US 2017/0182898 A1    Jun. 29, 2017

(51) Int. Cl.
*H02J 7/00* (2006.01)
*H02J 7/14* (2006.01)
*B60L 11/18* (2006.01)
*H02J 7/02* (2016.01)

(52) U.S. Cl.
CPC ....... *B60L 11/1818* (2013.01); *B60L 11/1816* (2013.01); *B60L 11/1824* (2013.01); *B60L 11/1825* (2013.01); *B60L 11/1833* (2013.01); *B60L 2200/18* (2013.01); *H02J 7/0021* (2013.01); *H02J 7/0027* (2013.01); *H02J 7/025* (2013.01)

(58) Field of Classification Search
USPC ....... 320/109, 107, 108, 137, 104, 160, 117, 320/118, 162; 307/104, 10.1, 9.1; 180/65.1
See application file for complete search history.

(56) References Cited

U.S. PATENT DOCUMENTS

| | | | | | |
|---|---|---|---|---|---|
| 6,157,162 | A | * | 12/2000 | Hayashi | B60L 11/1818 320/104 |
| 2009/0121678 | A1 | * | 5/2009 | Mitake | B60L 5/42 320/109 |
| 2011/0181241 | A1 | * | 7/2011 | Badger | B60L 11/1818 320/109 |
| 2011/0285349 | A1 | * | 11/2011 | Widmer | B60L 11/182 320/108 |
| 2011/0295420 | A1 | * | 12/2011 | Wagner | G05D 1/0225 700/245 |
| 2011/0298422 | A1 | * | 12/2011 | Failing | B60L 3/00 320/109 |
| 2012/0280656 | A1 | * | 11/2012 | Bedell | B60L 3/0069 320/109 |

(Continued)

FOREIGN PATENT DOCUMENTS

| | | | | | |
|---|---|---|---|---|---|
| GB | 2526118 | | * 11/2015 | ............. | B60L 11/16 |
| GB | 2526118 | A | * 11/2015 | ............. | B60L 11/16 |

*Primary Examiner* — Alexis Pacheco
(74) *Attorney, Agent, or Firm* — Bookoff McAndrews, PLLC

(57) ABSTRACT

A charging station for charging an electric vehicle may include a charge head movably attached to a charge head assembly and at least one head landing switch including a lever and a contact element. A first end of the lever may be rotatably coupled to the charge head and an opposite second end of the lever may be rotatably coupled to the contact element. At least a bottom surface of the contact element may be positioned below the bottom surface of the charge head such that the contact element can contact the roof of the electric vehicle before the bottom surface of the charge head can contact the roof. And, a width of the contact element may be greater than a width of the seam on the charging interface.

20 Claims, 7 Drawing Sheets

(56) References Cited

U.S. PATENT DOCUMENTS

| | | | |
|---|---|---|---|
| 2013/0193918 A1* | 8/2013 | Sarkar | B60L 3/04 320/109 |
| 2016/0130851 A1* | 5/2016 | Storm | B60L 11/1818 49/31 |

* cited by examiner

CHARGE HEAD LANDING SWITCH

TECHNICAL FIELD

The current disclosure relates to a head landing switch for an electric vehicle charging system and methods of using the head landing switch.

BACKGROUND

Electric vehicles, such as transit buses, are charged at a charging station. The charging station includes an overhanging charge head that automatically engages with a charging interface of the bus to charge the bus. When the bus is positioned below the charging interface, the charge head descends and lands on the roof of the bus. A head landing switch on the charge head indicates when the charge head has landed on the roof. With the charge head resting on the roof, the bus is moved forward to engage the charge head with the charging interface. As the bus moves, the charge head along with the head landing switch slides on the roof towards the charging interface. When the roof surface is even, the charge head slides smoothly towards the charging interface. However, when the roof surface has discontinuities, the head landing switch may get stuck on these discontinuities as the charge head slides on the roof surface.

Embodiments of the current disclosure may alleviate some of the problems discussed above and/or other problems in the art. The scope of the current disclosure, however, is defined by the attached claims, and not by the ability to solve any specific problem.

SUMMARY

Embodiments of the present disclosure relate to head landing switches of electric vehicle charging systems. Each of the embodiments disclosed herein may include one or more of the features described in connection with any of the other disclosed embodiments.

In one embodiment, a charging station for charging an electric vehicle is disclosed. The electric vehicle may have a charging interface with a seam on its roof. The charging station may include a charge head assembly arranged to overhang the roof of the electric vehicle, and a charge head movably attached to the charge head assembly. The charge head may be configured to descend from the charge head assembly such that a bottom surface of the charge head can contact the roof of the electric vehicle. The charging station may also include at least one head landing switch including a lever and a contact element. A first end of the lever may be rotatably coupled to the charge head and an opposite second end of the lever may be rotatably coupled to the contact element. At least a bottom surface of the contact element may be positioned below the bottom surface of the charge head such that the contact element can contact the roof of the electric vehicle before the bottom surface of the charge head can contact the roof. And, a width of the contact element may be greater than the width of the seam on the charging interface.

In another embodiment, a charging station for charging an electric vehicle is disclosed. The electric vehicle may include a charging interface with a seam on its roof. The charging station may include a charge head configured to provide charge to the electric vehicle. The charge head may include a cavity that extends along a longitudinal axis of the charge head from one end of the charge head to an opposite end of the charge head. The charge head may be configured to descend from a first position to a second position in which a bottom surface of the charge head is in contact with the roof of the electric vehicle. The charging station may also include multiple head landing switches attached to the charge head and positioned symmetrically about the longitudinal axis on opposite sides of the cavity. Each head landing switch of the multiple head landing switches may include a lever and a substantially cylindrical contact element. A first end of the lever may be rotatably coupled to the charge head and an opposite second end of the lever may be attached to the contact element. At least a bottom surface of the contact element may be positioned below the bottom surface of the charge head such that the contact element contacts the roof of the electric vehicle before the bottom surface of the charge head contacts the roof. And, a width of the contact element may be greater than the width of the seam on the charging interface.

In yet another embodiment, an electric vehicle charging system is disclosed. The system may include an electric vehicle with a charging interface on a roof of the vehicle. The charging interface may include multiple panels configured to be opened and closed and a seam formed between the multiple panels. The charging interface may also include a plurality of electrodes. The system may also include a charge head assembly configured to provide charge to the electric vehicle. The charge head assembly may be arranged to overhang the roof of an electric vehicle. The charge head assembly may include a charge head movably attached to the charge head assembly. The charge head may be configured to descend from the charge head assembly such that a bottom surface of the charge head contacts the roof of the electric vehicle. The system may also include at least one head landing switch attached to the charge head. The at least one head landing switch may include a lever and a cylindrical contact element. A first end of the lever may be rotatably coupled to the charge head and an opposite second end of the lever may be rotatably coupled to the contact element. At least a bottom surface of the contact element may be positioned below the bottom surface of the charge head such that the wheel contacts the roof of the electric vehicle before the bottom surface of the charge head contacts the roof. And, a width of the contact element may be greater than the width of the seam on the charging interface.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes head landing switches of electric vehicle charging systems. While principles of the current disclosure are described with reference to the charging system of an electric bus, it should be understood that the disclosure is not limited thereto. Rather, the systems and methods of the present disclosure may be used in charging systems of any vehicle.

Figure 1:
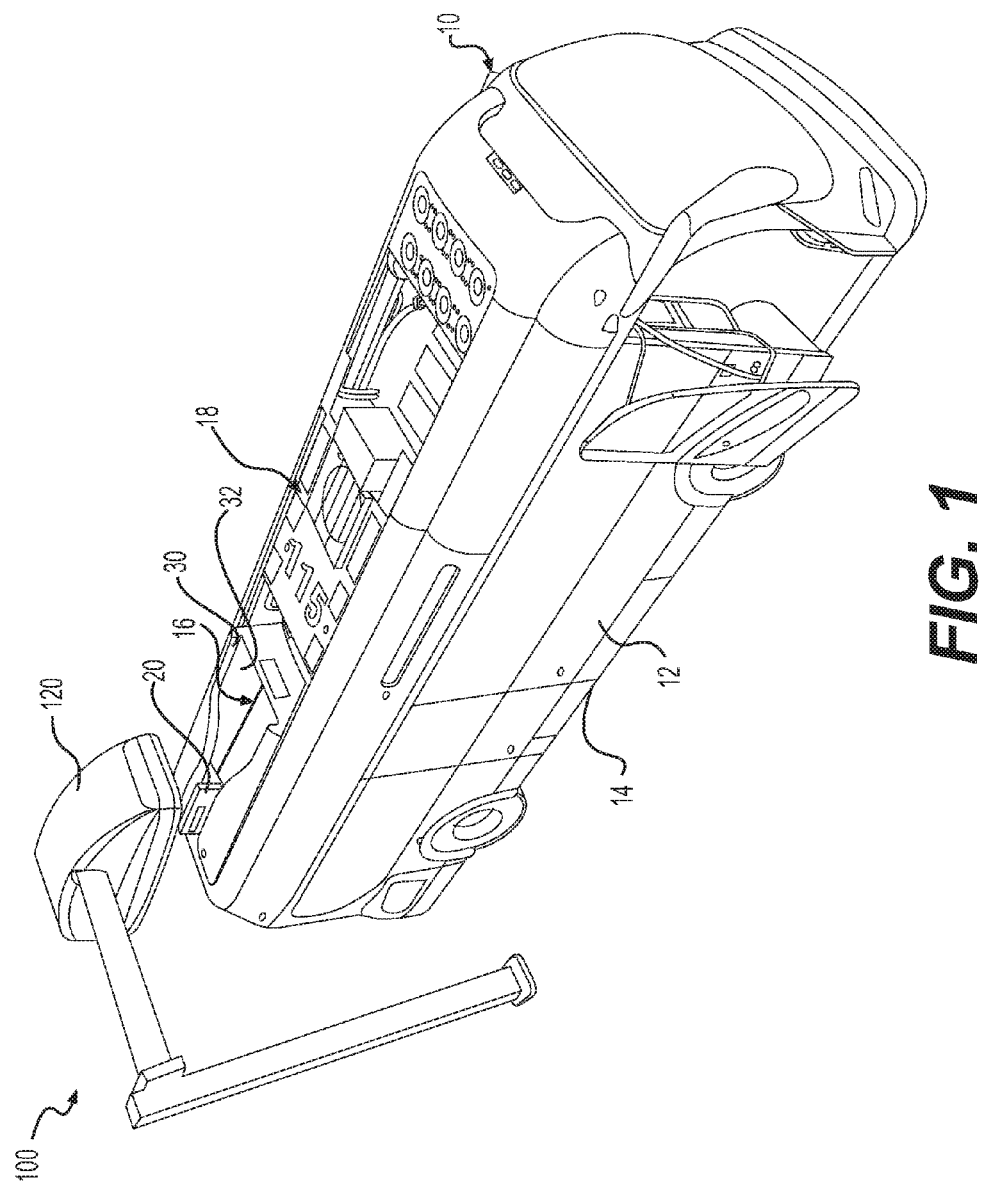
FIG. 1 illustrates an exemplary electric bus of the current disclosure.

FIG. 1 illustrates an electric vehicle in the form of an electric transit bus 10. Electric bus 10 may include a body 12 enclosing a space for passengers. In some embodiments, some (or all) parts of body 12 may be fabricated using composite materials to reduce the weight of the bus 10. Without limitation, body 12 of bus 10 may have any size, shape, and configuration. In some embodiments, bus 10 may be a low-floor electric bus. As is known in the art, in a low-floor bus, there are no steps at the front and/or the back doors of the bus. In such a bus, the floor of the bus 10 is positioned close to the road surface to ease entry and exit into the bus 10. In some embodiments, the floor height of the low-floor bus may be about 12-16 inches (30.5-40.6 cm) from the road surface. In this disclosure, relative terms, such as, "about," "approximately," "substantially," etc. are used to indicate a possible variation of ±10% in a stated value.

Bus 10 may be propelled by an electric motor. A battery system 14 may store electrical energy to power the motor. In some embodiments, the battery system 14 may be positioned under the floor of the bus 10, and may be configured as a plurality of batteries configured as battery packs. These battery packs may be positioned in cavities (not shown) located under the floor of the bus 10, and may be accessible from below the bus 10. The batteries of battery system 14 may have any chemistry and construction. In some embodiments, the batteries may be lithium titanate batteries or nickel manganese cobalt batteries. In some embodiments, the layout and design of the battery system 14 may enable fast charging of the batteries. By fast charging, the battery system 14 may be recharged (to greater than about 95% state of charge) in less than or equal to about 10 minutes.

Figure 2A:
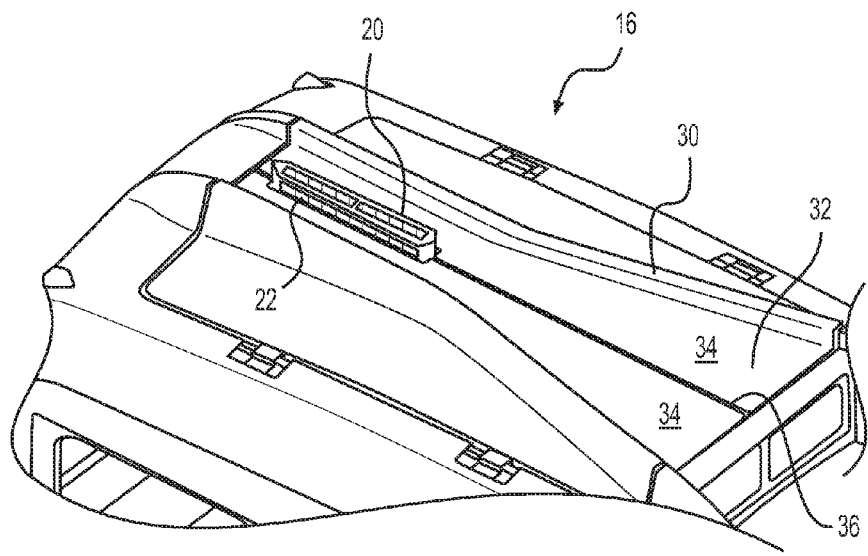
FIGS. 2A and 2B illustrate an exemplary charging interface of the bus of FIG. 1.
Figure 2B:
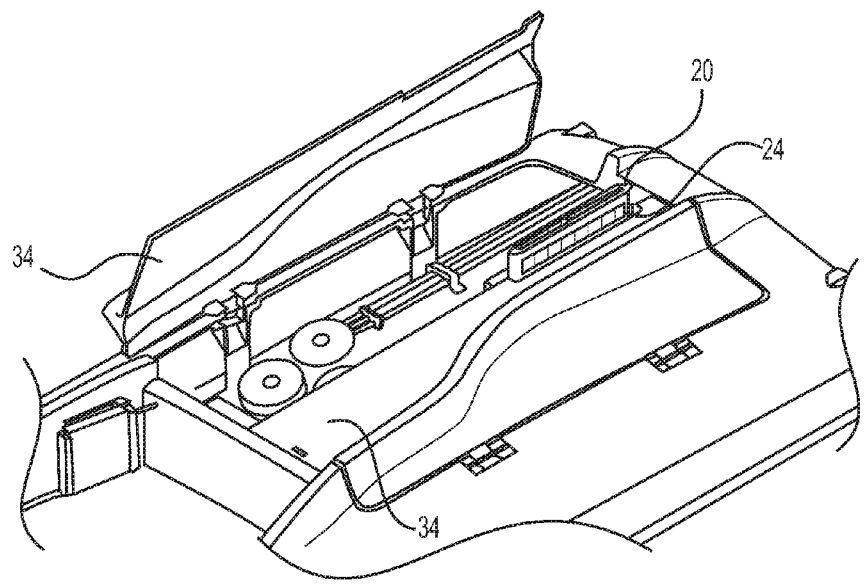

A charging interface 16 may be provided on the roof 18 of the bus 10 to charge the battery system 14. FIGS. 2A and 2B illustrate an exemplary charging interface 16 on the roof 18 of bus 10. The charging interface 16 may include components that interface with a charge head assembly 120 of an external charging station 100 (see FIG. 1) to charge the battery system 14. Charging interface 16 may include a charging blade 20 and a funnel-shaped alignment scoop 30. The charging blade 20 may include electrodes 22, 24 that are electrically coupled to the battery system 14. To charge the bus, when bus 10 is positioned under the charge head assembly 120 of charging station 100, a charge head (see FIG. 6A) of the charge head assembly 120 may descend to land on a landing zone 32 of the charging interface 16. With the charge head on the landing zone 32, the bus 10 is moved forward to engage the electrodes 132 (shown in FIG. 4) of the charge head with the electrodes 22, 24 of the blade 20. The alignment scoop 30 includes a pair of rails (wall or other features) that extend along a portion of the length of the bus on either side of the blade 20. The pair of rails are arranged such that they are spaced further apart (wider portion) at the front (relative to the direction of bus travel) than at the rear (narrower portion) to have a funnel-shaped configuration. As the bus moves forward, the funnel-shaped alignment scoop 30 directs the charge head resting on the landing zone 32 towards the charging blade 20 positioned between the rails in the narrower portion. The funnel shape of the alignment scoop 30, and the lateral play of the charge head, enables the charging system to tolerate some amount of lateral misalignment between the charge head assembly 120 of charging station 100 and the charging interface 16 of the bus 10.

The charging interface 16 may include components and devices (switches, fuses, etc.) that assist in charging the battery system 14 using power from charge head assembly 120. In some embodiments, these components may be placed under the charging interface 16. In some embodiments, as illustrated in FIG. 2B, the landing zone 32 of the charging interface 16 may be configured as two hinged doors 34 that may be opened to reveal a cavity under the charging interface 16. The components may be positioned under the doors 34 of the charging interface 16. When the doors 34 are closed, they may join together at a seam 36. The seam 36 may be a gap between the doors 34. In some embodiments, the gap may be minimal or even non-existent. In some embodiments, due to variations in the dimensions of components (i.e., tolerance stack-up), the gap between the doors 34 (i.e., width of seam 36) may be significant. In general, the width of the seam 36 may vary from about 0 to 1 inch.

Electric bus 10 may be a transit bus that operates along a fixed route in a geographic area (city, town, airport, campus, etc.). Bus 10 may continuously travel on the route picking up and dropping off passengers at several bus stops along the route. One or more charging stations 100 may be located along the route to charge the buses 10. Some of these charging stations 100 may be located at bus stops. A bus 10 may be recharged while passengers embark and disembark at the bus stop.

Figure 3A:
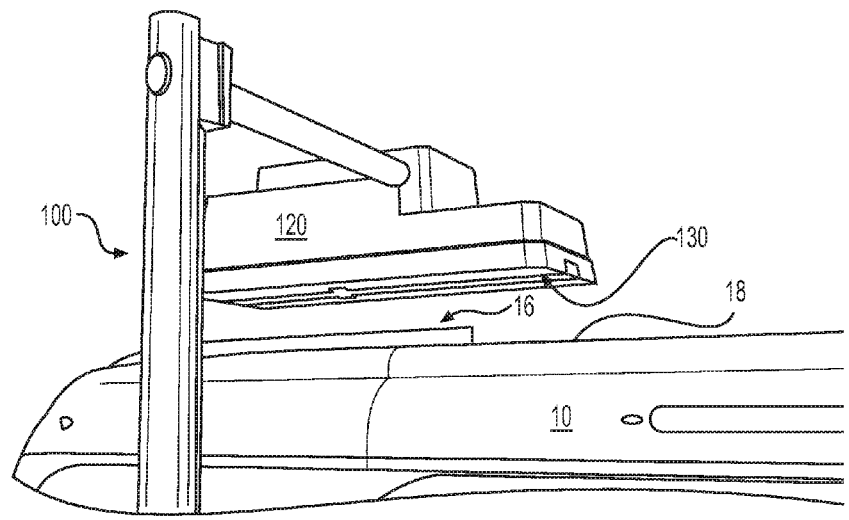
FIGS. 3A and 3B illustrate the bus of FIG. 1 positioned at an exemplary charging station.
Figure 3B:
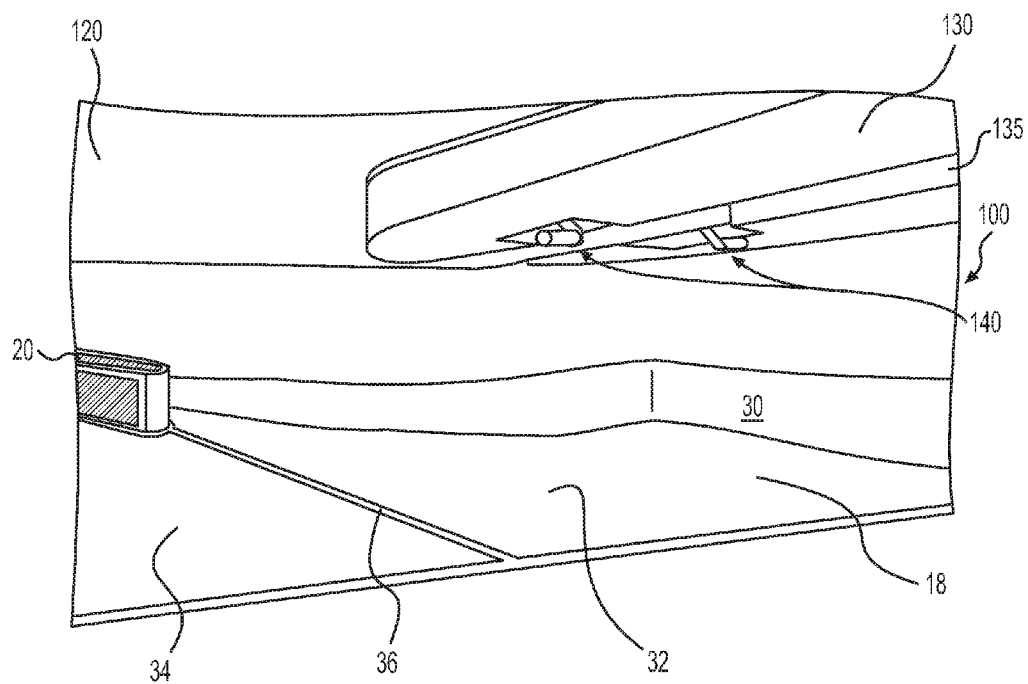

FIGS. 3A and 3B illustrate an exemplary charging station 100 with a bus 10 positioned under the charge head assembly 120 of the charging station 100. FIG. 3A illustrates a view of the charge head assembly 120 positioned over the roof 18 of the bus 10, and FIG. 3B illustrates a close up view of the region between the roof 18 and the charge head assembly 120 as viewed from the roof 18. In the description that follows, reference will be made to both FIGS. 3A and 3B. In general, the charge head assembly 120 may be configured to overhang the roof 18 of the bus 10. In some embodiments, as illustrated in FIG. 3A, the charge head assembly 120 may be connected to a cantilever arm that is connected to a post fixed to the ground. However, other configurations are also possible. For example, in some embodiments, the cantilever arm may extend sideways from the side of a building, or the charge head assembly 120 may extend downwards from a roof that extends over the road surface.

The charging station 100 may be coupled to an electric grid that is supplied with energy (electricity) by a utility company. Single phase or three-phase AC current from the electrical grid may be converted into DC current and directed into the charge head assembly 120. It is also contemplated that, in some embodiments, single phase or three phase AC current may be directly transferred to the vehicle for rectification (conversion to DC) in the vehicle. The charge head assembly 120 includes a charge head 130 that houses electrodes to engage with electrodes 22, 24 in the charging blade 20 (of the bus 10) to direct power from the charge head assembly 120 to the battery system 14. With the bus 10 positioned under the charge head assembly 120, the charge head 130 may be lowered to land on the landing zone 32 of the charging interface 16. In some embodiments, the charge head 130 may be lowered automatically (e.g., pneumatically) when the bus 10 is suitably positioned under the charge head assembly 120. In some embodiments, lowering of the charge head 130 may be triggered manually. Sensors (e.g., ultrasonic sensors) on the charging station 100 and/or the bus 10 may indicate when the bus 10 is suitably positioned under the charge head assembly 120.

Figure 4:
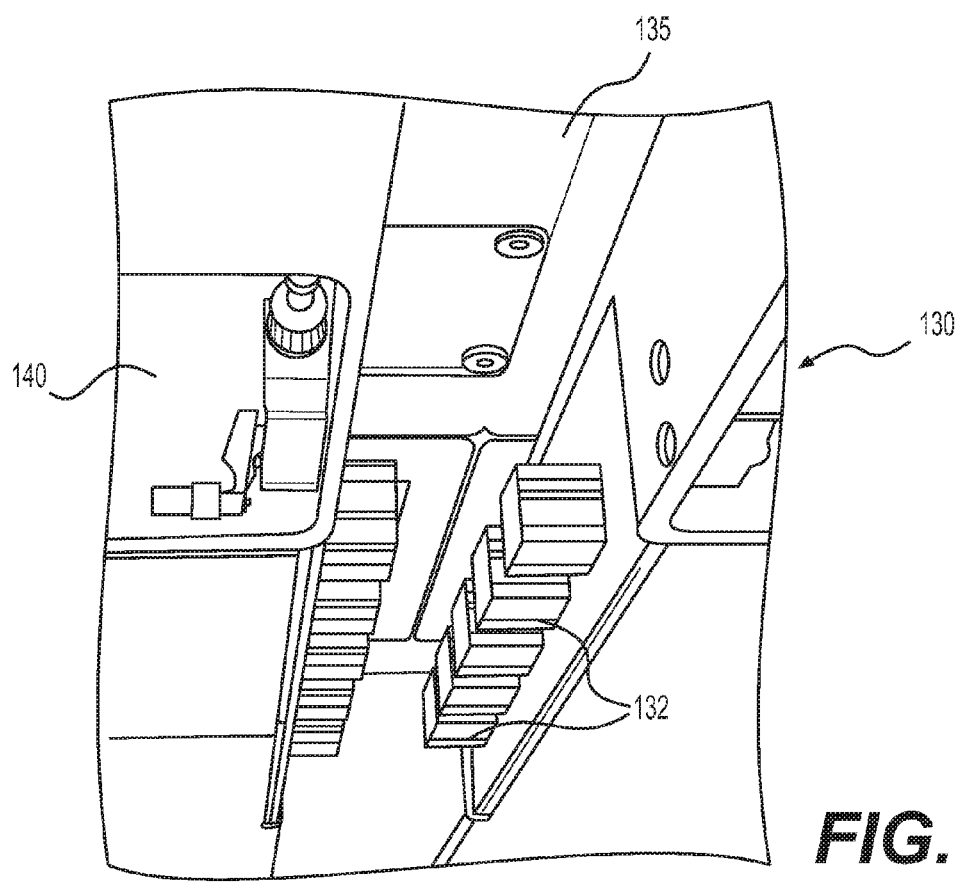
FIG. 4 illustrates an exemplary charge head of the charging station of FIG. 3A.

FIG. 4 illustrates an exemplary charge head 130 as viewed from the roof 18 of the bus 10. The charge head 130 includes a central channel 135 that is aligned in the direction of travel of the bus 10. When the bus 10 moves forward with the charge head 130 resting on its roof, the charging blade 20 of the bus 10 slides into the central channel 135 to engage with the charge head 120 (see FIG. 5B). One or more electrodes 132 may extend into the central channel 135 from the side walls of the channel 135. Although any type of electrodes may be used, in some embodiments, electrodes 132 may be carbon brushes impregnated with a conductive material. The electrodes 132 may engage with electrodes 22, 24 on the charging blade 20 when the blade 20 is positioned in the channel 135. In some embodiments, the electrodes 132 may be spring loaded electrodes that are biased to remain in an extended configuration (as seen in FIG. 3) to contact the electrodes 22, 24 of the blade 20 when the blade 20 is positioned in the channel 135. In some embodiments, the electrodes 132 may initially remain in a retracted configuration (not shown), and may be actuated (pneumatically, electrically, etc.) to an extended configuration to contact the electrodes 22, 24 of the blade 20.

Figure 5A:
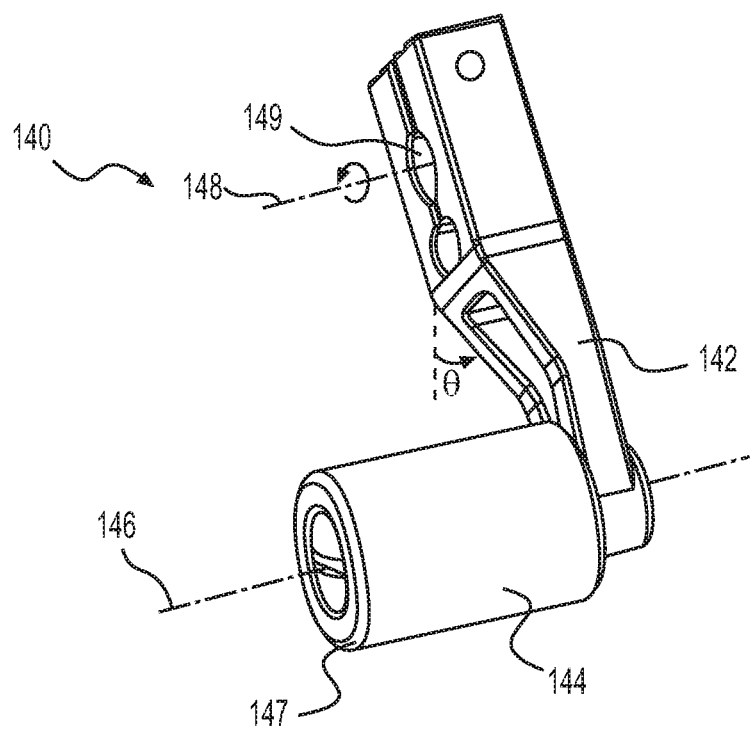
FIGS. 5A and 5B illustrate an exemplary head landing switch of the charge head of FIG. 4.
Figure 5B:
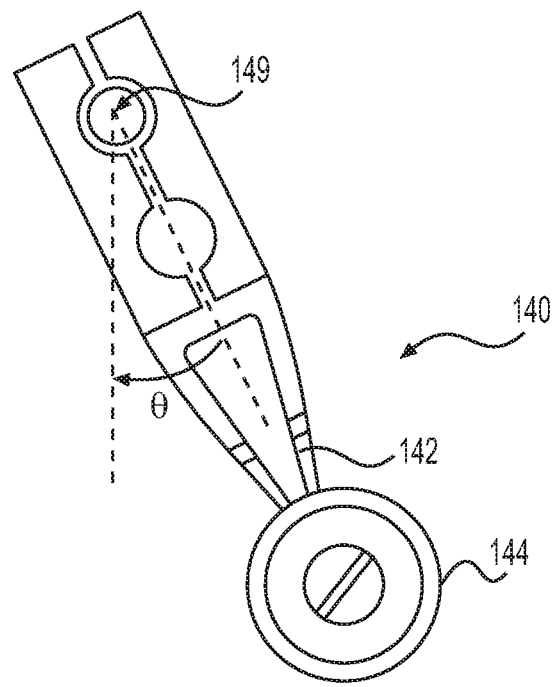

Charge head 130 may also include one or more head landing switches 140 that indicates when the charge head 130 lands on the bus roof 18. The head landing switches 140 may protrude downwards (towards the bus 10) from a bottom surface of the charge head 130. FIGS. 5A and 5B illustrate an exemplary head landing switch 140 of the charge head 130. FIG. 5A illustrates a perspective view of the head landing switch 140 and FIG. 5B illustrates its side view. In the description that follows, reference will be made to both FIGS. 5A and 5B. The head landing switch 140 may include a contact element 144 attached to a lever 142 at one end. The opposite end of the lever 142 may be rotatably attached to a rotary switch 150 at a pivot point 149. Rotary switch 150 may be any conventional switch that may be operated by rotation. Rotation of the lever 142 to a preselected point may activate the rotary switch 150. In some embodiments, the contact element 144 may be a cylindrically shaped member or wheel configured to rotate on the lever 142 about an axis 146. The lever 142 may be configured to rotate about the pivot point 149 of the switch 150 about an axis 148. Axis 148 may be substantially parallel to axis 146. The lever 142 may be spring loaded such that, in its normal configuration, the lever 142 is inclined at an angle of θ from a vertical axis passing through the pivot point 149. Angle θ may have any value between about 20-70 degrees. In the inclined configuration, the contact element 144 may be displaced from the pivot point 149 along the direction of bus travel. As the charge head 130 descends on the landing zone 32 of the roof 18, the contact element 144 makes first contact with the roof 18. As the charge head 130 continues to descend, the lever 142 is rotated about axis 148 towards the switch 150. In some embodiments, when the charge head 130 lands on the landing zone 32, the contact element 144 is pushed into a recess or a pocket (see recess in FIGS. 3B, 4) on the bottom surface of the charge head 130 activating switch 150. In some embodiments, the recess may be eliminated. Activation of switch 150 indicates (e.g., by activating an indicator light, sound, etc.) to the driver of bus 10 that the charge head 130 has landed on the landing zone 32. This indication may be used as a signal for the driver to begin moving the bus forward. In some embodiments, activation of the switch 150 may be detected by a control system that automatically initiates movement of the bus upon receipt of this signal.

In general, the head landing switch 140 and contact element 144 may have any shape and size. For reasons that will be explained later, typically, the width of contact element 144 may be greater than the width of the gap 36 between the doors 34 of the charging interface 16 (see FIGS. 2A, 2B). In general, it may also be advantageous to make the width of the contact element as small as possible to minimize the packaging envelope in the charge head system. The width of the contact element 144 may be selected such that the contact element 144 effectively serves the function of identifying that the charge head 130 has landed on the appropriate surface on the bus roof 18. If the width of the contact element 144 is too large, the switch 150 may be erroneously triggered even when the charge head 130 has not landed in the proper place. For example, if the charge head 130 lands at an angle on a rail of the alignment scoop 30 (i.e., one side of the charge head 130 rests on a rail and the opposite side rests on the roof 18 (see FIG. 3B)), the geometry and size (e.g., width) of the contact element 144 should be such that switch 150 is not triggered. If the contact element 144 is too wide, the switch 150 may be triggered when the charge head 130 has not landed in the proper position (e.g., in the above-described configuration), and the control system will erroneously think that the head 130 has landed in the proper location.

In some embodiments, the contact element 144 may have a cylindrical shape having a width between about 15-50 mm (0.59-1.96 inches). In some embodiments, the width of the contact element 144 may be between about 25-30 mm (0.98-1.18 inches) and a diameter of the contact element 144 may be between about 17-20 mm (0.67-0.79 inches). In some embodiments, the contact element 144 may have a chamfer 147 at its ends. In some embodiments, both ends of the contact element 144 may be chamfered. In other embodiments, only one end (e.g., the end of the contact element 144 opposite the lever 142) may be chamfered. Providing a chamfer only on one end or side of the contact element 144 (as opposed to a chamfers on both ends of the contact element 144) may enable the width of the contact element 144 to be minimized. Providing a chamfer only on the end of the contact element 144 opposite the lever 142 enables the contact element 144 to traverse the gap 36 from one side while reducing the width of the contact element 144 (see for example, FIGS. 7A-7C). The width of the contact element 144 and its chamfer 147 may enable the contact element 144 to traverse the gap 36 on the charging interface 16.

Although a cylindrical contact element 144 is illustrated and described herein, this is only exemplary. In general, contact element 144 may have any shape. For instance, in some embodiments, the contact element 144 may be configured as a spherical ball or may be saucer shaped. The lever 142 may also have any shape and size. In some embodiments, the lever 142 may have a length between about 50-60 mm (1.97-2.4 inches). Any material may be used for the contact element 144 and the lever 142. In some embodiments, the lever 142 may be made of steel or aluminum and the contact element 144 may be made of a polymer material.

Figure 6A:
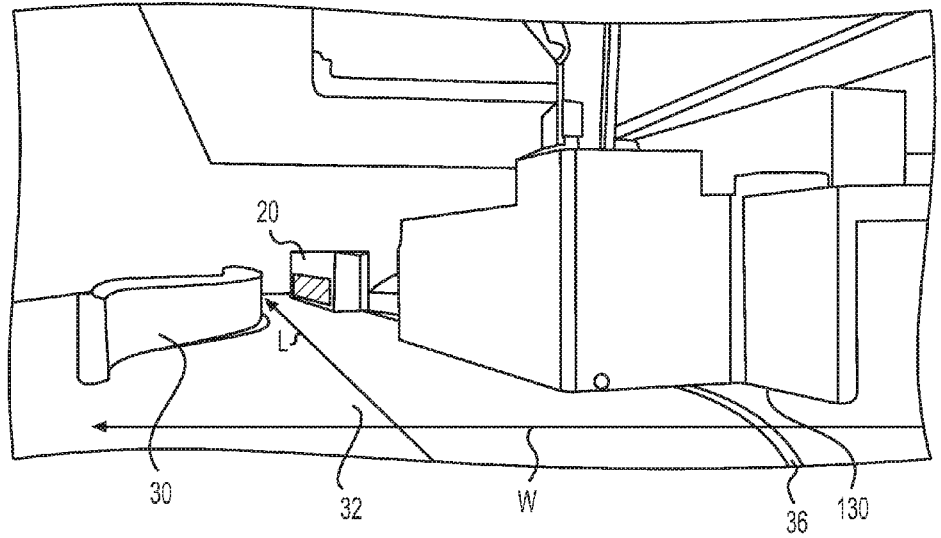
FIGS. 6A and 6B are illustration of the charge head of FIG. 4 on the charging interface of the bus of FIG. 1.
Figure 6B:
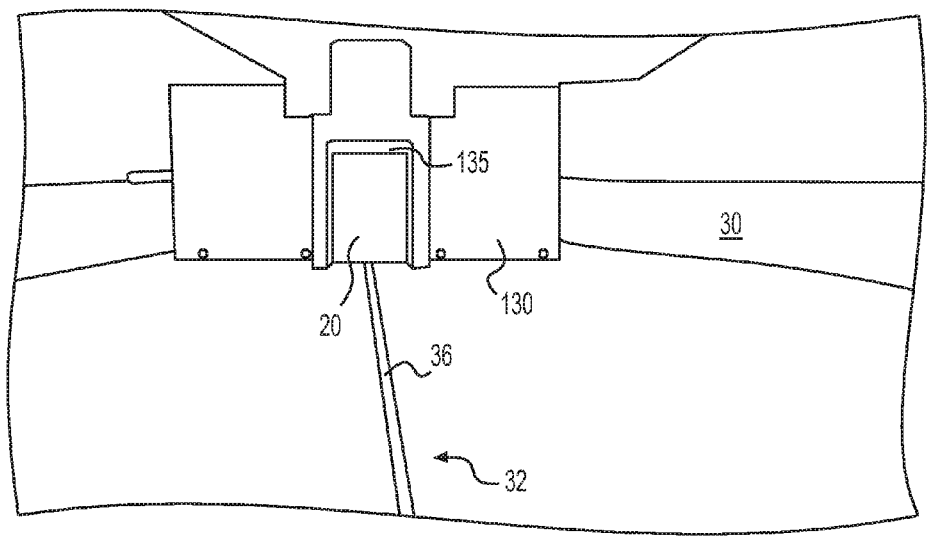

FIGS. 6A and 6B are illustrations of an exemplary charge head 130 resting on the charging interface 16. FIG. 6A shows a view immediately after the charge head 130 has landed on the landing zone 32, and FIG. 6B shows a view of the charge head 130 after the bus is moved to engage the charge head 130 with the blade 20. In the discussion that follows, reference will be made to both FIGS. 6A and 6B. After the head landing switch 140 indicates that the charge head 130 has landed on the landing zone 32, the bus 10 is moved forward to engage the charge head 130 with the charging blade 20 of the bus 10. As the bus 10 moves forward, the charge head 130 slides along the length L of the charging interface 16 towards the blade 20. As the charge head 130 slides along the length L, the rails of the funnel-shaped alignment scoop 30 pushes the head 130 along the width W of the interface 16 as it moves towards the blade 20 positioned at the narrow portion between the rails. As the charge head 130 slides along this narrow portion, the center channel 135 of the charge head 130 gets aligned with the blade 20. Upon further movement of the bus 10, the blade 20 enters the center channel 135 (as illustrated in FIG. 6B) and the spring loaded electrodes 132 make electrical contact with the electrodes 22, 24 on the charging blade 20 to begin charging.

Figure 7A:
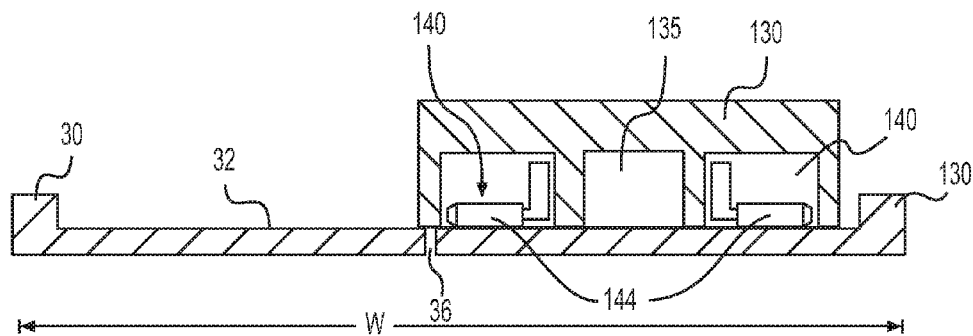
FIGS. 7A-7C are schematic cross-sectional illustrations of the charge head at different positions on the charging interface.
Figure 7B:
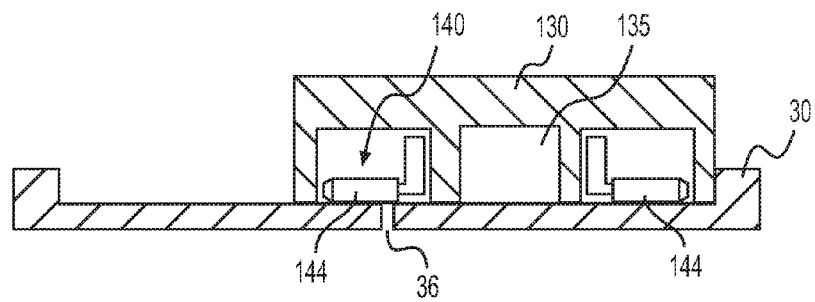
Figure 7C:
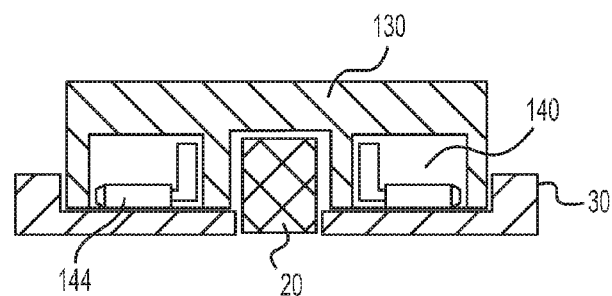

FIGS. 7A-7C are schematic cross-sectional illustrations of the charge head 130 at different positions along the length L of the charging interface 16 as it slides towards the blade 20. FIG. 7A is a view of the charge head 130 after it has landed on the landing zone 32. In general, the charge head 130 may land anywhere along the width W of the charging interface 16. FIG. 7B is a view of the charge head 130 as it slides along the length L of the charging interface 16 towards the blade 20. Although FIGS. 7A-7C illustrate two lead landing switches 140, in general, the charge head 130 may include any number of head landing switches. As the charge head 130 slides along the length L, the contact element 144 of the head landing switch 140 slides (or rolls about axis 146) on the charging interface 16. Due to its funnel-shaped configuration, the alignment scoop 30 pushes the charge head 130 across the width W of the charging interface 16 as it slides along the length L of the interface 16. As the charge head 130 slides across the width W, the contact element 144 of the head landing switch 140 slides across the seam 36 formed between the doors 34 of the interface 16. The width of the contact element 144 (and/or its chamfer 147 at its end) may enable the contact element 144 to smoothly traverse across the seam 36 without getting stuck in the seam 36. FIG. 7C is a view of the charge head 130 with the blade 20 positioned in the central cavity 135 of the charge head 130. In this configuration, electrodes of the charge head 130 contact the electrodes of the blade 20, and charging occurs. After charging is complete, the bus 10 is driven forward and the charge head 130 is raised. As the bus is driven forward, the blade 20 passes through the central cavity 135 of the charge head 130 to separate from the charge head 130.

While the current disclosure describes using a head landing switch with a charging station of a bus, it should be understood that the disclosure is not limited thereto. Rather, the principles of the systems and methods described herein may be employed in any charging system. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A charging station for charging an electric vehicle, the electric vehicle including a charging interface on its roof, the charging interface including a landing zone with a seam extending along a direction of vehicle movement, comprising:
    a charge head assembly arranged to overhang the roof of the electric vehicle;
    a charge head movably attached to the charge head assembly, the charge head being configured to descend from the charge head assembly such that a bottom surface of the charge head contacts the landing zone of the charging interface on the roof of the electric vehicle; and
    at least one head landing switch including a lever and a contact element, wherein a first end of the lever is rotatably coupled to a rotary switch on the charge head at a pivot point, and an opposite second end of the lever extends below the bottom surface of the charge head and is rotatably coupled to the contact element, wherein, when the charge head descends, the contact element contacts the landing zone before the bottom surface of the charge head contacts the landing zone, and causes the lever to rotate about the pivot point to move the contact element towards the bottom surface of the charge head and activate the rotary switch, and wherein a width of the contact element is greater than the width of the seam on the landing zone, and the contact element is configured to roll or slide on the landing zone across the seam.

2. The charging station of claim 1, wherein the contact element is a cylindrical wheel configured to rotate about the lever about a first axis and the lever is configured to rotate about the pivot point about a second axis substantially parallel to the first axis.

3. The charging station of claim 2, wherein the bottom surface of the charge head includes a pocket configured to receive the contact element therein, and wherein the lever is configured to rotate about the second axis to position the contact element in the pocket when the charge head contacts the landing zone of the electric vehicle.

4. The charging station of claim 2, wherein the width of the contact element is between about 15-50 mm (0.59-1.96 inches).

5. The charging station of claim 2, wherein a width of the contact element is between 25-30 mm (0.98-1.18 inches) and a diameter of the contact element 144 is between about 17-20 mm (0.67-0.79 inches).

6. The charging station of claim 2, wherein the contact element includes one of a polymer or a metal.

7. The charging station of claim 2, wherein the contact element extends from a first end to a second end, wherein the first end is attached to the lever and the second end includes a chamfer.

8. The charging station of claim 1, wherein the lever of the head landing switch makes an angle of about 20-70 degrees with an axis normal to the bottom surface of the charge head.

9. The charging station of claim 1, wherein the charge head includes cavity that extends along a longitudinal axis of the charge head, the cavity being configured to receive electrodes of the electric vehicle therein, and wherein the at least one head landing switch includes two head landing switches symmetrically positioned about the longitudinal axis on opposite sides of the cavity.

10. A charging station for charging an electric vehicle, the electric vehicle including a charging interface on its roof, the charging interface including a landing zone with a seam extending along a direction of vehicle movement, comprising:

a charge head configured to provide charge to the electric vehicle, the charge head including a cavity that extends along a longitudinal axis of the charge head from one end of the charge head to an opposite end of the charge head, the charge head being configured to descend and land on the landing zone of the charging interface such that a bottom surface of the charge head contacts the landing zone; and multiple head landing switches attached to the charge head and positioned symmetrically about the longitudinal axis on opposite sides of the cavity, each head landing switch of the multiple head landing switches including a lever and a substantially cylindrical contact element, wherein a first end of the lever is rotatably coupled to a rotary switch on the charge head at a pivot point, and an opposite second end of the lever extends below the bottom surface of charge head and is attached to the contact element, wherein, when the charge head descends, the contact element contacts the landing zone before the bottom surface of the charge head contacts the landing zone, and causes the lever to rotate about the pivot point to move the contact element towards the bottom surface of the charge head and activate the rotary switch, and wherein a width of the contact element is greater than the width of the seam on the landing zone, and the contact element is configured to roll or slide on the landing zone across the seam.

11. The charging station of claim 10, wherein the bottom surface of the charge head includes a pocket configured to receive the contact element therein, and wherein the lever is configured to rotate about the pivot point to position the contact element in the pocket when the charge head contacts the landing zone of the electric vehicle.

12. The charging station of claim 10, wherein the width of the contact element is between about 15-50 mm (0.59-1.96 inches).

13. The charging station of claim 10, wherein the width of the contact element is between 25-30 mm (0.98-1.18 inches) and a diameter of the contact element 144 is between about 17-20 mm (0.67-0.79 inches).

14. The charging station of claim 10, wherein the contact element includes one or a polymer or a metal.

15. The charging station of claim 10, wherein the contact element extends from a first end to a second end, wherein the first end is attached to the lever and the second end includes a chamfer.

16. The charging station of claim 10, wherein the lever of the head landing switch makes an angle of about 20-70 degrees with an axis normal to the bottom surface of the charge head.

17. An electric vehicle charging system, comprising:
an electric vehicle with a charging interface on a roof of the vehicle, the charging interface including:
 a landing zone with multiple doors configured to be opened and closed;
 a seam formed between the multiple doors; and
 a plurality of electrodes; and
a charge head assembly configured to provide charge to the electric vehicle, the charge head assembly being arranged to overhang the roof of an electric vehicle, the charge head assembly including:
 a charge head movably attached to the charge head assembly, the charge head being configured to descend from the charge head assembly such that a bottom surface of the charge head contacts the landing zone on the roof of the electric vehicle; and
 at least one head landing switch attached to the charge head, the at least one head landing switch including a lever and a cylindrical contact element, wherein a first end of the lever is rotatably coupled to a rotary switch on the charge head at a pivot point, and an opposite second end of the lever extends below the bottom surface of charge head and is rotatably coupled to the contact element, wherein, when the charge head descends, the contact element contacts the landing zone before the bottom surface of the charge head contacts the landing zone, and causes the lever to rotate about the pivot point to move the contact element towards the bottom surface of the charge head and activate the rotary switch, and wherein a width of the contact element is greater than the width of the seam on the landing zone, and the contact element is configured to roll or slide on the landing zone across the seam.

18. The charging system of claim 17, wherein the bottom surface of the charge head includes a pocket configured to receive the contact element therein, and wherein the lever is configured to rotate about the charge head to position the contact element in the pocket when the charge head contacts the landing zone of the electric vehicle.

19. The charging system of claim 17, wherein a width of the contact element is between about 15-50 mm (0.59-1.96 inches).

20. The charging system of claim 19, wherein the contact element extends from a first end to a second end, the first end being attached to the lever and the second end including a chamfer.

* * * * *